United States Patent [19]
Hou

[11] Patent Number: 6,117,368
[45] Date of Patent: Sep. 12, 2000

[54] BLACK AND WHITE ELECTROPHORETIC PARTICLES AND METHOD OF MANUFACTURE

[75] Inventor: Wei-Hsin Hou, Bethlehem, Pa.

[73] Assignee: Copytele, Inc., Melville, N.Y.

[21] Appl. No.: 08/361,891

[22] Filed: Dec. 21, 1994

Related U.S. Application Data

[63] Continuation of application No. 08/050,840, Apr. 21, 1993, abandoned.

[51] Int. Cl.$^7$ ..................................................... H01B 3/18
[52] U.S. Cl. ............................ 252/572; 252/73; 252/77; 252/79; 313/483; 359/296
[58] Field of Search ................................. 292/572, 73, 77, 292/79; 313/483; 204/299 R; 525/309; 359/296

[56] References Cited

U.S. PATENT DOCUMENTS

| | | | |
|---|---|---|---|
| 3,047,507 | 7/1962 | Winslow | 252/75 |
| 4,093,534 | 6/1978 | Carter et al. | 350/355 |
| 4,285,801 | 8/1981 | Chaing | 204/299 R |
| 4,298,448 | 11/1981 | Muller et al. | 204/299 R |
| 4,655,897 | 4/1987 | DiSanto et al. | 204/299 R |
| 4,876,313 | 10/1989 | Lorah | 525/281 |
| 4,916,171 | 4/1990 | Brown et al. | 525/309 |
| 4,992,192 | 2/1991 | Ahmed | 252/73 |
| 5,298,833 | 3/1994 | Hou | 313/483 |
| 5,336,423 | 8/1994 | Pialet et al. | 252/76 |
| 5,403,894 | 4/1995 | Tsai et al. | 525/309 |

OTHER PUBLICATIONS

E.B. Bradford et al., "Electron Microscopy of Monodisperse Latexes", Journal of Applied Physics, vol. 26, No. 7 Jul. 1955, pp. 864–870.

J.W. Vanderhoff et al., "Preparation of Large–Particle–Size Mionodisperse Latexes in Space", Polym. Mater. Sci. Eng., vol. 54, pp. 587–593 (1986) No Month Available.

F.K. Hansen, B.J. Ugelstad, "Particle Neucleation in Emulsion Polymerization., IV. Nucleation in Monomer Droplets", Journal Poly. Sci. Polym. Chem., vol. 17 pp. 3069–3082, (1979) No Month Available.

C.M. Tseng, et al., "Uniform Polymer Particles by Dispersion Polymerization in Alcohol", Journal Polym. Sci., Polym. Chem., vol. 24, pp. 2995–3006 (1996) No Month Available.

M. Okubo et al., "Preparation of Micron–size Monodisperse Polymer Micropheres Having Crosslinked Structures and Vinyl Groups", Colloid. Polym. Sci. vol. 269, pp. 217–221 (1991) No Month Available.

K. Kobayashi & M. Senna, "Independent Control of Mechanical and Chemical Properties of Monodispersed Polystrene—Divinyl Benzene Micropheres by Two–Step Polymerization", Journal Appl. Polym. Sci. vol. 46, pp. 27–40 (1992) No Month Available.

Wei–Hsin Hou et al., "Pigmented Polymer Particles With Controlled Morphologies", Polymer Latexes, ACS Symposium Series 492, Chap. 25, pp. 405–421 (1992) No Month Available.

*Primary Examiner*—Christine Skane
*Attorney, Agent, or Firm*—Arthur L. Plevy, Esq.; Buchanan Ingersoll PC

[57] ABSTRACT

A process for forming dielectric particles includes admixing a first monomer and a crosslinker in a liquid dispersion medium to form a first mixture. A second mixture of an initiator and a stabilizer is prepared and added to the first mixture to form a third mixture in which the first monomer polymerizes to form polymer particles. A second monomer is introduced to the third mixture, the second monomer at least partially polymerizing and grafting upon the previously formed polymer particles. A functional monomer effecting the outer surface charge characteristics of the final particles may be introduced to the third mixture when the second monomer is introduced. The particles may be employed in an electrophoretic fluid for use in an electrophoretic display by dispersing the dielectric particles prepared by the two stage polymerization process in a dielectric fluid.

15 Claims, 1 Drawing Sheet

BLACK AND WHITE ELECTROPHORETIC PARTICLES AND METHOD OF MANUFACTURE

This is a continuation of application Ser. No. 08/050,840, filed on Apr. 21, 1993, entitled Black and White Electrophoretic Particles and Method of Manufacture now abandoned.

FIELD OF THE INVENTION

The present invention relates to dielectric particles and methods for producing same and more particularly to dielectric black and dielectric white particles for use in electrophoretic image displays, electrostatic printing or the like.

BACKGROUND OF THE INVENTION

The electrophoretic effect is well known and the prior art is replete with a number of patents and articles which describe the effect. As will be recognized by a person skilled in the art, the electrophoretic effect operates on the principle that certain particles, when suspended in a medium, can be electrically charged and thereby caused to migrate through the medium to an electrode of opposite charge. Electrophoretic image displays (EPIDs) utilize the electrophoretic effect to produce desired images. In prior art EPIDs, colored dielectric particles are suspended in a fluid medium that is either clear or an optically contrasting color as compared to the dielectric particles. The colored electrophoretic particles are then caused to selectively migrate to, and impinge upon, a transparent screen, thereby displacing the fluid medium against the screen and creating the desired image.

As will be recognized by a person skilled in the art, the selection of the electrophoretic particles used in the EPID is very important in determining the performance of the EPID and the quality of the viewed image produced. Ideally, electrophoretic particles should all be of a uniform size, to help in assuring that each of the electrophoretic particles will behave similarly. Additionally, it is desirable to utilize electrophoretic particles that have essentially the same density as the fluid medium in which they are suspended. By using electrophoretic particles of essentially the same density as the suspension medium, the migration of the electrophoretic particles through the medium remains independent of both the orientation of the EPID and the forces of gravity.

To effect the greatest optical contrast between electrophoretic particles and the suspension medium, it is desirable to have either white particles suspended in a black medium or black particles suspended in a backlighted clear medium. In the prior art, it has been proven difficult to produce black electrophoretic particles that are dielectric, of uniform size and have a density matching that of a common suspension medium. As a result, EPIDs commonly use readily manufactured light colored electrophoretic particles suspended in dark media. Such EPIDs are exemplified in U.S. Pat. No. : 4,655,897 to DiSanto et al., U.S. Pat. No. 4,093,534 to Carter et al., U.S. Pat. No. 4,298,448 to Muller et al., and U.S. Pat. No. 4,285,801 to Chaing. In such prior art, light colored particles are commonly inorganic pigments which have fairly high densities. With the electric field applied, the light colored particles migrate through the grayish suspension producing a light image on a gray background, thereby resulting in an image that is not highly contrasted.

Although titanium dioxide used in EPIDs produces a good optical contrast between the white particles and the suspension medium, it has a density about 4 $g/cm^3$ which is too high to be matched with an organic solvent. Sedimentation becomes a problem. In the past decade, great effort has been spent to solve the density problem of titanium dioxide. Coating titanium dioxide particles with a polymeric material to reduce the density of titanium dioxide is an example. Phase separation, direct emulsification, emulsion polymerization and miniemulsion polymerization are the most common techniques used to make the polymer-coated titanium dioxide particles. The uniformity of the coating thickness and the size of final particles made by these methods cannot be well controlled, this causes a large difference in density among final particles, and balancing the density between the final particles and the suspension medium is still a difficult problem.

In application to EPID displays, the properties of the white particles is highly specialized. First, the density of the particles must be low and uniform in order to be balanced with the suspension medium to prevent sedimentation of the particles. Secondly, the particles must have well controlled surface functionalities for particle charging in dielectric media in order to reach an optimum electrophoretic mobility for electrophoretic imaging. Thirdly, the particles must have suitable crosslinking density as well as particle size and size distribution in order to form good whiteness yielding better optical contrast with the dark medium. Finally, the particles must have good heat and solvent resistance. Conventional techniques of making crosslinked polymer particles are suspension polymerization, emulsion polymerization, miniemulsion polymerization. Unfortunately, the properties of crosslinked polymer particles required in EPID are difficult to obtain by the conventional techniques.

Crosslinked polymer particles prepared by a suspension polymerization technique have wide particle size distribution, e.g. 1–50 μm, which requires classification of the polymer particles. Polymer particles with a narrow particle size distribution can only be obtained at a very low yield. Emulsion polymerization can produce crosslinked polymer particles with a very narrow size distribution, however, it only can produce particle sizes in a sub-micron range (J. Appl. Phys., 26(7), 864 (1955)). In addition, only small amounts of crosslinking monomers can be used, producing particles with poor heat and solvent resistance and poor whiteness. Using the seeded emulsion polymerization technique, crosslinked polymer particles with uniform particle sizes greater than 1 μm can be produced, however, it takes a long time to complete the whole process (Polym. Mater. Sci. Eng. 54, 587 (1986)). On the other hand, miniemulsion polymerization produces (J. Polym. Sci., Polym. Chem. Ed., 17,3069 (1979)) polymer particles having higher crosslinking density, however, the particle size distribution is too broad to obtain uniform electrophoretic mobility resulting in poor electrophoretic images.

It has been reported that it is difficult to produce stable uniform crosslinked polymer particles by a dispersion polymerization method when the crosslinking monomers is over 1% by weight (J. Polym. Sci., Polym. Chem. Ed., 24, 2995 (1986). Reports are also found for preparing styrene/divinylbenzene particles by batch dispersion co-polymerization and seeded dispersion copolymerization respectively (Colloid Polym. Sci., 269, 217 (1991), however, good monodispersity and heat and solvent resistance still can not be obtained. More recently, Kobayashi and Senna reported production of uniform styrene/divinylbenzene polymer particles with high crosslink density using a dispersion polymerization technique (J. Appl. Polym. Sci., 46,27 (1992)). Although they claimed that the highly crosslinked polymer particles are uniform in size and are greater than 1 μm, no claim was made in regard to controlling of surface functionalities of the final particles, which is so important for particle charging in dielectric media, particularly in EPIDs.

In addition to using white particles suspended in a dark medium to produce contrast images, one may alternatively suspend black particles in a backlighted clear medium. However, as has been mentioned, the development of suitable dielectric black particles remains a goal in the art of electrophoretic image displays. In art other than EPIDs, black particles are commonly produced from carbon. However, carbon blacks are not readily adaptable to EPIDs because carbon blacks are conductive and the density of carbon blacks is not readily matched to a suitable suspension medium. Research efforts have been made in an attempt to solve the density and conductivity problems of carbon blacks, however, none has succeeded without trading off some blackness in the particles created. Such efforts to produce dielectric particles from carbon blacks are exemplified in the following article Hou et al. "Pigmented-Polymer Particles With Controlled Morphologies", (Polymer Latexes, ACS Symposium Series 492, Chap. 25, p. 405, 1992).

SUMMARY OF THE INVENTION

The problems and disadvantages associated with conventional dielectric particles and methods for making same are overcome by the present invention which includes a process for forming dielectric particles in which a first monomer is polymerized in a dispersion medium to form particles. A second monomer is then polymerized in the same medium and grafts upon the previously formed particles. The surface functionality of the particles is controlled. The particles may be employed in an electrophoretic fluid for use in an electrophoretic display by dispersing the dielectric particles prepared by the two stage polymerization process in a dielectric fluid.

DETAILED DESCRIPTION OF THE INVENTION

The present invention uses a two-stage dispersion polymerization technique to produce highly crosslinked polymer particles with whiteness sufficient for good image contrast in dark suspension media and which have a density close to 1 g/cm$^3$. The particles can be used as white electrophoretic particles (instead of titanium dioxide) in EPIDs and have uniform size and low density and are easy to balance with the density of many organic solvents.

Particles in accordance with the present invention have specialized surface functionalities which permit control of particle charging in dielectric media to produce an optimum electrophoretic mobility, which, with controlled particle size, size distribution and crosslinking density, permit production of high quality electrophoretic images.

The present invention may also be employed to produce black electrophoretic particles which do not use carbon black. Rather, highly crosslinked polymer particles stained with a metal oxide are used to form dielectric black particles suitable for use in an EPID. More particularly, the preferred embodiment of the present invention uses a two-stage dispersion polymerization technique to produce highly crosslinked polymer particles which are further reacted with a metal oxide to form dielectric black particles with good blackness. These particles yield good image contrast in a backlighted clear medium, have uniform size and low density which make them easy to density match with any organic solvents, and have specialized surface functionalities which allow control of particle charging in dielectric media to produce optimum electrophoretic mobility.

Although the present invention black and white particles can be used in many different applications where particles of high blackness or whiteness and low density are desired, such as coating, printing ink and electrostatic printing, they are especially suitable for use in connection with electrophoretic image displays (EPIDs). Accordingly, the present invention black and white dielectric particles will be described in connection with typical EPIDs.

Figure 1:
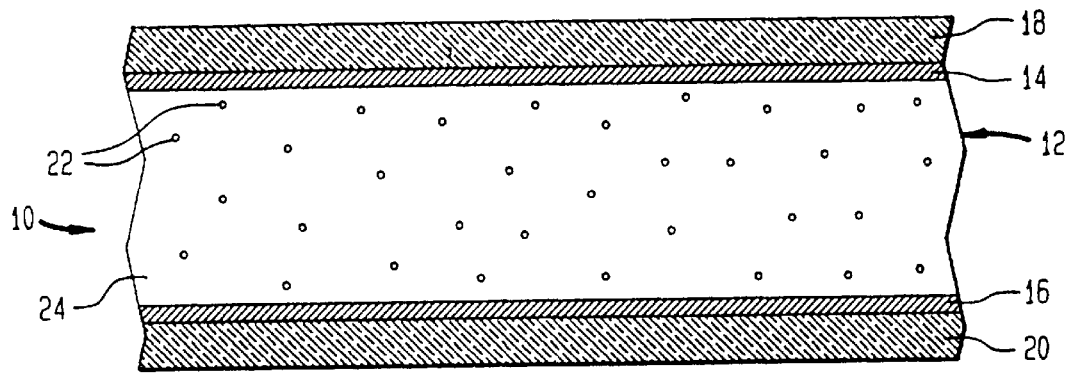
FIG. 1 is a diagrammatic, cross-sectional view of an EPID having particles in accordance with a first embodiment of the present invention.

Referring to FIG. 1, there is shown a cross sectional view of a segment of a simple electrophoretic image display 10, magnified to show a single pixel (intersection). As will be recognized by a person skilled in the art, an EPID may contain a volume of an electrophoretic dispersion 12 disposed between an anode 14 and a cathode 16. The anode 14 and cathode 16 are deposited upon glass plates 18, 20 in the form of a thin layer of indium-tin-oxide (ITO) or a like compound. The ITO layer is deposited in such a manner as to be substantially transparent when viewed through the glass plates 16, 18.

In accordance with a first embodiment of the present invention, the electrophoretic dispersion 12 is comprised of white dielectric electrophoretic particles 22 suspended in a dark color medium 24. The electrophoretic particles 22 have a density substantially equivalent to that of the fluid medium 24 so as to remain randomly disperse in the fluid medium 24, unaffected by the orientation of the EPID or the effects of gravity. When a sufficient electrical bias is applied between the anode 14 and cathode 16, the electrophoretic particles 22 migrate in response thereto to either the cathode 16 or anode 14 depending on polarity and displace the dark color medium 24 adjacent to the ITO layer, thereby creating a white pixel. Reversing the voltage produces a dark pixel.

Figure 2:
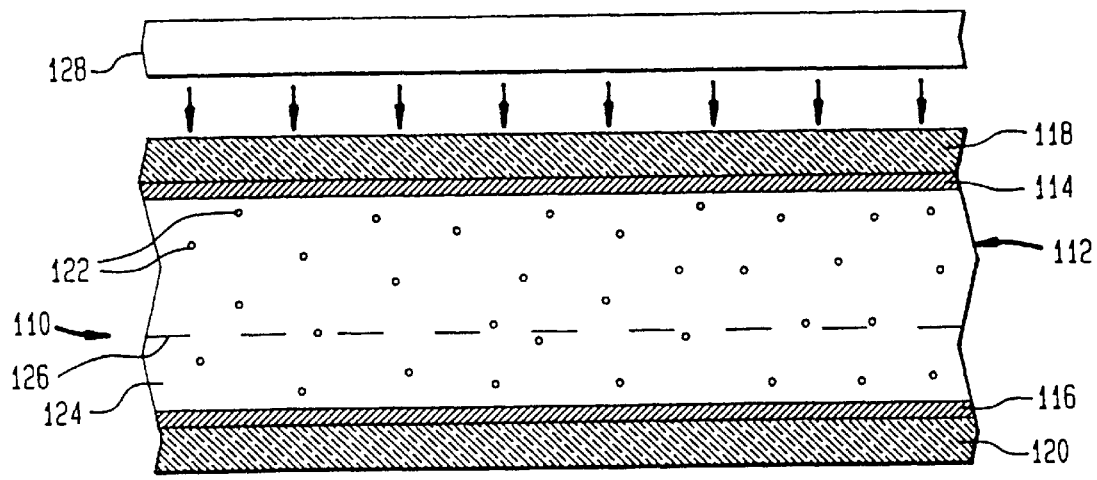
FIG. 2 is a diagrammatic cross-sectional view of an alternative EPID construction having particles in accordance with a second embodiment of the present invention.

FIG. 2 shows in cross section a pixel of another type of EPID 110 wherein electrophoretic dielectric particles are employed in the manner of a shutter. As will be recognized by a person skilled in the art, an EPID of this type contains a volume of an electrophoretic dispersion 112 disposed between an anode 114 and a cathode 116 as in FIG. 1. A conductive mesh 126 is disposed in the fluid 112 between the cathode 116 and anode 114.

In accordance with a second embodiment of the present invention, the electrophoretic dispersion 112 is comprised of black dielectric electrophoretic particles 122 suspended in clear medium 124. The electrophoretic particles 122 have a density substantially equivalent to that of the fluid medium 124 so as to remain randomly disperse in the fluid medium 124, unaffected by the orientation of the EPID or the effects of gravity. When the cathode 116, anode 114 and the mesh 126 are properly biased, the electrophoretic particles 122 may be made to migrate to cathode 116 displacing the clear medium 124 adjacent to the ITO layer, thereby blocking the light produced by the light source 128. Alternately, the electrodes may be biased so that the particles 122 cling to the mesh and do not block light from source 128. The displayed pixel is therefore black or white depending on the voltage settings.

As noted previously, the production of a white image on a dark color background or a black image on a light background is highly desirable. However, a major obstacle to such a combination has been the lack of dielectric black and white particles that have good hiding power and also a density that can be readily matched with common suspension fluids. The present invention black electrophoretic particles 122 and white electrophoretic particles 22 are formed from crosslinked polymer particles using two stage dispersion polymerization techniques with and without staining with a metal oxide respectively. In general, the polymeric materials are dielectric and have densities close to 1 g/cm$^3$, thus the final electrophoretic particles are non-conductive and can easily be matched with many common EPID suspension fluids without any sedimentation problem. Since the electrophoretic particles are highly crosslinked polymer particles, they have excellent heat and solvent resistance and can be used in a wide range of organic solvents, even at high temperatures during cell sampling. In addition, the particle size, size distribution and surface functionalities of the final particles can be precisely controlled during the second-stage polymerization to produce electrophoretic particles with optimum electrophoretic mobilities in dielectric media for developing high quality images.

The dielectric white electrophoretic particles 22 of highly crosslinked polymer with controlled surface functionality are prepared by a two-stage dispersion polymerization technique. As will be recognized by a person skilled in the art, two-stage dispersion polymerization involves dispersing vinyl monomers and a crosslinker in an organic solvent in which the monomers and crosslinker are soluble and then polymerizing the vinyl monomers and the crosslinker in the presence of a dispersion stabilizer and an initiator at elevated temperatures. The polymerized monomer is insoluble in the solvent, thereby forming polymer particles. The second stage functional monomer is copolymerized on the insoluble polymer particles by injecting the functional monomer at a later stage of polymerization.

EXAMPLE ONE

In an exemplary embodiment of the present invention, dielectric, white, electrophoretic, highly crosslinked polymer particles 22 with controlled surface functionality, are prepared by a two-stage dispersion polymerization technique. The polymerization recipe is listed in Table I.

TABLE I

| Materials | Weight (g) |
| --- | --- |
| Methanol | 100 |
| divinylbenzene | 5 |
| styrene | 5 |
| 2,2'-azobisisobutyronitrile | 0.5 |
| poly(vinyl pyrrolidone) | 2 |
| Acrylamide | 0.5 |

Prior to use, the inhibitors of the monomer styrene and the crosslinker divinylbenzene are removed by washing with 10% NaOH aqueous solution several times, drying with calcium carbonate overnight at 0° C. and then passing through a column containing an appropriate inhibitor remover. The inhibitor-free monomers and crosslinker are stored in a freezer for later use. In this and subsequent processes, the styrene is of the type commercially available from Fisher Scientific, Inc. and the divinylbenzene is of the type commercially produced by Aldrich Chemical, Co. The 2,2'-azobisisobutyronitrile (AIBN) and poly(vinyl pyrrolidone) (PVP) used as an initiator and stabilizer are manufactured by Kodak and GAF Co. respectively. The second stage monomer, acrylamide, and the dispersion medium, methanol, a reagent grade, are of the types commercially available from Fisher Scientific, Inc.

The styrene and divinylbenzene are mixed with methanol and charged to a closed container containing the AIBN and PVP which are carefully weighed. The closed container is purged with nitrogen by bubbling the gas through the solution for a certain time. The container is then warmed and agitated for a desired reaction time. In one preferred embodiment, the mixture is tumbled at thirty revolutions per minute for eight hours at sixty degrees celsius. After eight hours tumbling, the second stage monomer, acrylamide, is injected into the container which continues to tumble at the same reaction condition for another desired reaction time. The final product made by the two-stage dispersion polymerization process is highly crosslinked poly(styrene-co-divinylbenzene) particles with polyacrylamide grafted on the surface. The particle size of the final particles are uniform and varied from 0.2 to 10 μm depending upon the reaction media be used. The final particles are dielectric with good whiteness and have a density close to 1 g/cm$^3$. The polymer particles are separated from the dispersion medium by centrifuging and decanting the dispersion medium.

To form black particles, the product of the previous process is mixed and tumbled with osmium tetroxide aqueous solution at room temperature for a desired reaction time. The osmium tetroxide reacts with and stains the residual double bonds of the poly(styrene-co-divinylbenzene) particles, thereby resulting in highly crosslinked polymer particles having a desired degree of blackness that can be used as the present invention electrophoretic particles 122. It should be understood that in place and stead of the osmium tetroxide, ruthenium tetroxide or other metal oxides may also be used.

By varying the polymerization recipe of Table I and by varying other reaction parameters of the method of manufacture, the physical characteristics of the white and black particles produced can be selectively altered as needed for a given application. The surface functionality of the final particles can be varied by introducing different functional monomers, such as vinyl acetate, methyl methacrylate, acrylonitrile, acrylamide, dimethylaminopropylmethacrylamide, and the like, at the second stage polymerization to produce poly(styrene-co-divinylbenzene) particles with basic surface characteristics which are suitable for positive charging in dielectric media.

The use of a dispersion stabilizer in the preparation of crosslinked polymer particles is essential for preventing particle coagulation during polymerization. Various synthetic high molecular weight compounds including homopolymers, copolymers, graft polymers, block copolymers, and the like, can be used as a dispersion stabilizer. In addition to poly(vinyl pyrrolidone) other suitable dispersion stabilizers are polyisobutylene succinimide, poly(methyl-methacrylate)-g-poly(12-hydroxy stearic acid) and the like.

The monomer, styrene, can be substituted by different vinyl monomers such as methyl methacrylate, vinyl acetate, acrylate, ethyl vinylbenzene, vinylpyridine, acrylonitrile, and the like, to produce final particles with different properties such as density, reflective index, heat resistance, solvent resistance, . . . etc. The crosslinker, divinylbenzene, can also be substituted for with other compounds having two or more than two polymerizable double bonds such as nonconjugated divinyl compounds, diacrylate compounds, triacrylate compounds, dimethacrylate compounds, trimethacrylate compounds, and the like.

Other radical polymerization initiators which can be used in the two stage dispersion polymerization are 4,4'-azobis (r-cyanopentanic acid), 2,2'-azobis(2-methylbutyrontrile), benzoyl peroxide, lauroyl peroxide, octanoyl peroxide, and the like.

The dispersion medium, methanol, can be substituted for with other alcohols such as ethyl alcohol, propyl alcohol, butyl alcohol, amyl alcohol, benzyl alcohol, ether alcohol, and the like, or hydrocarbons such as hexane, octane, decane, cylcohexane, xylene, and the like, or with ethers, halogenated hydrocarbons, ketones, esters and the like.

In addition, the ratio of the monomer and crosslinker in the Table I can be varied to determine the physical properties of the final particles, such as density, reflective index, heat resistance, solvent resistance, particle size and so on.

After the second stage polymerization process, the final polymer particles are transferred from the dispersion medium to a desired dielectric medium by a washing process which comprises mixing the final product with a solvent which is mixable with both the dispersion medium and the desired dielectric medium, centrifuging the mixture to separate the particles and the liquids and decanting the supernatant to yield the concentrated particles. The washing procedure is repeated several times until the methanol is completely removed. The solvent washed particles are then dispersed in the desired dielectric medium with the addition of a charge control agent and a dark color dye. Sometimes, a stabilizer or a co-stabilizer is added to the final dispersion to help prevent the particles from coagulating. Therefore, the final dispersion contains electrophoretic particles having a positive electrophoretic mobility dispersed in a dark color-dye solution which gives good optical contrast with the white particles, and is ready to be used in EPIDs.

In the case of black particles, the metal oxide stained particles are transferred from the aqueous staining solution to a desired dielectric medium by the same washing process as outlined above. After being transferred to the desired medium, a charge control agent, sometimes together with a stabilizer or a costabilizer, is added to the dispersion to produce a final black dispersion containing positively charged black particles suspended in a clear medium, which is ready to use in EPIDs.

The preferred dielectric media for the final dispersion are non-polar solvents such as tetracholorethylene, carbon tetrachloride, pentane, octane, decane, cyclohexane, benzene, xylene, Isopars, sec-butylbenzene, and the like, or a mixture of the liquids. The solvents used for washing the particles should be mixable with both the dispersion medium and the dielectric medium, examples are ethanol, propanol, butanol, acetone, tetrahydrofuran, ketones, ethers, esters, and the like. The desirable charge control agents for positive charging are surfactants with a acidic character such as polyisobutylene succinic anhydride, cupric naphthenate, zirconium octoate, zinc octoate, calcium octoate, polyvinyl alcohol, polyacrylic acid, polymethacrylic acid, polyvinyl chloride, and the like. A dark colored dye such as Solvent Blue, Oil Blue A, Sudan Black B, Sudan Red 7B and the like, is preferred. The preferable stabilizers or co-stabilizer used with the charge control agents are high molecular weight compounds including homopolymers, copolymers, graft polymers, block copolymers, natural high molecular compounds, and the like. Specific examples of suitable stabilizers are poly(12-hydroxystearic acid)-graft-poly (methyl methacrylate-methacrylic acid), polystyrene-co-poly(vinyl pyridine), poly(vinyl alcohol)-co-polyethylene, and the like.

EXAMPLE TWO

In an alternative embodiment of the present invention, white, electrophoretic, highly crosslinked polymer particles 22 with controlled surface functionality, are prepared by a two-stage dispersion polymerization technique. The polymerization recipe is listed in Table II.

TABLE II

| Materials | Weight (g) |
|---|---|
| Methanol | 100 |
| divinylbenzene | 5 |
| styrene | 5 |
| 2,2'-azobisisobutyronitrile | 0.5 |
| poly(acrylic acid) | 2 |
| methacrylic acid | 0.5 |

As in process one, the inhibitors of the monomer styrene and the crosslinker divinylbenzene are removed by washing with 10% NaOH aqueous solution several times, drying with calcium carbonate over night at 0° C. and then passing through a column containing an appropriate inhibitor remover. The inhibitor-free monomers and crosslinker are stored in a freezer for later use. In this, and subsequent processes, the styrene is of the type commercially available from Fisher Scientific, Inc. and the divinylbenzene is of the type commercially produced by Dow Chemical, Inc. The initiator, 2,2'-azobisisobutyronitrile (AIBN) is manufactured by Kodak Co. The second stage monomer, methacrylic acid and the stabilizer, poly(acrylic acid), are of the types commercially available from Aldrich Chemical Co. The dispersion medium, methanol, a reagent grade, is from Fisher Scientific, Inc.

The styrene and divinylbenzene are mixed with methanol and charged to a closed container containing the AIBN and poly(acrylic acid) which are carefully weighed. The closed container is purged with nitrogen by bubbling through the solution for a certain time. The container is then warmed and agitated for a desired reaction time. In one preferred embodiment, the mixture is tumbled at thirty revolutions per minute for eight hours at sixty degrees celsius. After eight hours of tumbling, the second stage monomer, methacrylic acid, is injected in the container which continues to tumble at the same reaction condition for another desired reaction time. The final product made by the two stage dispersion polymerization process is highly crosslinked poly(styrene-co-divinylbenzene) particles with poly(methacrylic acid) grafted on the surface. The particle size of the final particles is uniform and varied from 0.1 to 5 $\mu$m depending upon the reaction media used. The final particles are dielectric and have a density close to 1 g/cm$^3$. The polymer particles are separated from the dispersion medium by centrifuging and decanting the dispersion medium.

To form black particles, the particles of the previous process are then mixed and tumbled with a osmium tetroxide aqueous solution at room temperature for a desired reaction time. The osmium tetroxide reacts with and stains the residual double bonds of the poly(styrene-co-divinylbenzene) particles, thereby resulting in highly crosslinked polymer particles having a desired degree of blackness that can be used as the present invention electrophoretic particles 122. It should be understood that in place and stead of the osmium tetroxide, ruthenium tetroxide or other metal oxides may also be used.

By varying the polymerization recipe of Table II and by varying other reaction parameters of the method of manufacture, the physical characteristics of the white and black particles produced can be selectively altered as needed for a given application. The surface functionality of the final particles can be varied by introducing different functional monomers, such as acrylic acid, sodium styrene sulfonate, maleic acid, chlorostyrene, vinyl alcohol, and the like, at the second stage polymerization to produce poly(styrene-co-divinylbenzene) particles with acidic surface characteristics which are suitable for developing negative electrophoretic mobilities in dielectric media.

The use of a dispersion stabilizer in the preparation of crosslinker polymer particles is essential for preventing particle coagulation during polymerization. Various synthetic high molecular weight compounds including homopolymers, copolymers, graft polymers, block copolymers, and the like, can be used as a dispersion stabilizer. In addition to poly(acrylic acid), other suitable dispersion stabilizers are poly(vinyl alcohol), poly(methacrylic acid), sorbitan stearic acid monoester, and the like.

The monomer, styrene, can be substituted for by different vinyl monomers such as methyl methacrylate, vinyl acetate, acrylate, ethyl vinylbenzene, vinylpyridine, acrylonitrile, and the like to produce final particles with different properties such as density, reflective index, heat resistance, solvent resistance, . . . etc. The crosslinker, divinylbenzene, can also be substituted for by other compounds having two or more than two polymerizable double bonds such as nonconjugated divinyl compounds, diacrylate compounds, triacrylate compounds, dimethacrylate compounds, trimethacrylate compounds, and the like.

Other radical polymerization initiators which can be used in the two stage dispersion polymerization are 4,4'-azobis(4-cyanopentonic acid), 2,2'-azobis(2-methylbutyrontrile), benzoyl peroxide, lauroyl peroxide, octanoyl peroxide, and the like.

The dispersion medium, methanol can be substituted for with other alcohols such as ethyl alcohol, propyl alcohol, butyl alcohol, amyl alcohol, benzyl alcohol, ether alcohol, and the like, or with hydrocarbons such as hexane, octane, decane, cylcohexane, xylene, and the like, or with ethers, halogenated hydrocarbons, ketones, esters and the like.

In addition, the ratio of the monomer and crosslinker in the Table II can be varied to determine the physical properties of final particles, such as density, reflective index, heat resistance, solvent resistance, particle size and so on.

After the second stage polymerization process, the final polymer particles are transferred from the dispersion medium to a desired dielectric medium by a washing process which comprises mixing the final product with a solvent which is mixable with both the dispersion medium and the desired dielectric medium, centrifuging the mixture to separate the particles and the liquids and decanting the supernatant to yield the concentrated particles. The washing procedure is repeated several times until the methanol is completely removed. The solvent washed particles are then dispersed in the desired dielectric medium with the addition of a charge control agent and a dark color dye. Sometimes, a stabilizer or a co-stabilizer is added to the final dispersion to help prevent the particles from coagulating. Therefore, the final dispersion contains white electrophoretic particles having negative electrophoretic mobility dispersed in a dark color dye fluid which gives a good optical contrast with the white particles, and is ready to be used in EPIDs.

In the case of black particles, the metal oxide stained particles are transferred from the aqueous solution to a desired dielectric medium by the same washing process described above. After being transferred to the desired medium, a charge control agent, sometimes together with a stabilizer or a costabilizer, is added to the dispersion to produce a final black dispersion containing negatively charged black particles suspended in a clear medium, which is ready to use in EPIDs.

The preferred dielectric media for both the black and white dispersion are non-polar solvents such as tetrachloroethylene, carbon tetrachloride, pentane, octane, decane, cyclohexane, benzene, xylene, Isopars, sec-butylbenzene, and the like or a mixture of the liquids. The solvents used for washing the particles should be mixable with both the dispersion medium and the dielectric medium, examples are ethanol, propanol, butanol, acetone, tetrahydrofuran, ketones, ethers, esters, and the like. The desirable charge control agents for negative charging are surfactants with a basic character such as polyisobutylene succinimide, barium petronate, barium sulfonate, barium dinonylnaphthalenesulfonate, metal oxides, polyvinyl pyridine, pyridine, lecithin, polyvinyl acetate, polyethylene oxide, polymethy methacrylate, polyacrylamide, polyesters, polyethers, and the like. A dark colored dye such as Solvent Blue, Oil Blue A, Sudan Black B, Sudan Red 7B, and the like is preferred. The preferable stabilizers or co-stabilizer used with the charge control agents are high molecular weight compounds including homopolymers, copolymers, graft polymers, block copolymers, natural high molecular compounds, and the like. Specific examples of suitable stabilizers are poly(12-hydroxystearic acid)-graft-poly(methyl methacrylate-methacrylic acid), polystyrene-co-poly(vinyl pyridine), poly(vinyl alcohol)-co-polyethylene, and the like.

As will be recognized by a person skilled in the art, the highly crosslinked polymer particles having surfaces with controlled acidic moieties or basic moieties, made by emulsion polymerization, miniemulsion polymerization, microemulsion polymerization, suspension polymerization, precipitation, seeded emulsion polymerization or seeded dispersion polymerization, can also be used as white electrophoretic particles, or be used as black electrophoretic particles after being stained with a metal oxide in electrophoretic image displays.

All equivalents, variations and modifications that can be applied to the described present invention by a person skilled in the art, are intended to be included within the scope of this invention as defined by the appended claims.

What is claimed is:

1. A process for forming an electrophoretic fluid for use in an electrophoretic display, comprising:

admixing a first monomer and a crosslinker in a dispersion medium; said dispersion medium being a polar solvent selected from the group consisting of alcohols, ethers, halogenated hydrocarbons, ketones and esters;

adding an initiator and a stabilizer to said dispersion medium so that said first monomer polymerizes to form dielectric polymer particles;

introducing a second monomer and a functional monomer to said dispersion medium, said second monomer and said functional monomer at least partially polymerizing and grafting upon said dielectric polymer particles to provide said particles with a surface functionality that is suitable for charging in an electrophoretic display;

separating said dielectric polymer particles from said dispersion medium; and dispersing said dielectric particles in a dielectric non-polar solvent, said dielectric non-polar solvent being different from said dispersion medium.

2. The process of claim 1, wherein said step of separating said dielectric particles from said dispersion medium includes centrifuging said dispersion medium and decanting the supernatant of said dispersion medium prior to said step of dispersing said particles in said dielectric fluid.

3. The process of claim 2, further including the steps of resolvating said dielectric particles after centrifuging said dispersion medium with a solvent miscible with said dispersion medium and with said dielectric fluid and further centrifuging said particles and decanting said solvent prior to dispersing said particles in said dielectric fluid.

4. The process of claim 3, further including the step of adding a charge control agent to said dielectric fluid after said step of dispersing in said dielectric fluid.

5. The process of claim 4, wherein said charge control agent comprises an acidic surfactant and a positive charge control agent.

6. The process of claim 5, wherein said positive charge control agent is selected from the group consisting of polyisobutylene succinic anhydride, cupric naphthenate, zirconium octoate, zinc octoate, calcium octoate, polyvinyl alcohol, polyacrylic acid, polymethacrylic acid and polyvinyl chloride.

7. The process of claim 4, wherein said charge control agent comprises a basic surfactant and a negative charge control agent.

8. The process of claim 7, wherein said negative charge control agent is selected from the group consisting of polyisobutylene succinimide, barium petronate, barium sulfonate, barium dinonylnaphthalensulfonate, metal oxides, polyvinyl pyridine, pyridine, lecithin, polyvinyl acetate, polyethelene oxide, polymethy methacrylate, polyacrylamide, polyesters and polyethers.

9. The process of claim 4, further including adding a dye to said dielectric fluid when said charge control agent is added.

10. The process of claim 9, wherein said dye is selected from the group consisting of Solvent Blue, Oil Blue A, Sudan Black B, and Sudan Red 7B.

11. The process of claim 4, further including the step of adding a stabilizer to said dielectric fluid when said charge control agent is added.

12. The process of claim 11, wherein said stabilizer is selected from the group consisting of homopolymers, copolymers and block copolymers.

13. The process of claim 1, wherein said dielectric fluid is a non-polar solvent.

14. The process of claim 1, wherein said dielectric fluid is selected from the group consisting of tetrachloroethylene, carbon tetrachloride, pentane, octane, decane, cyclohexane, benzene, xylene, sec-butylbenzene and Isopars.

15. The process of claim 3, wherein said solvent is selected from the group consisting of ethanol, propanol, butanol, acetone, tetrahydrofuran, ketones, ethers, and esters.

* * * * *